United States Patent [19]

Kuerbitz et al.

[11] 4,238,674
[45] Dec. 9, 1980

[54] PROCESS AND APPARATUS FOR PRODUCING A HEAT IMAGE WITH COMPENSATION OF THE PHASE ERROR DUE TO SCAN ACTION

[75] Inventors: Gunther Kuerbitz, Aalen-Ebnat; Walter Wegener, Koenigsbronn, both of Fed. Rep. of Germany

[73] Assignee: Carl Zeiss-Stiftung, Oberkochen, Fed. Rep. of Germany

[21] Appl. No.: 10,401

[22] Filed: Feb. 8, 1979

[30] Foreign Application Priority Data

Feb. 10, 1978 [DE] Fed. Rep. of Germany ....... 2805531

[51] Int. Cl.$^3$ ............................................. H01J 31/49
[52] U.S. Cl. .................................... 250/334; 250/347
[58] Field of Search ............... 250/330, 332, 334, 338, 250/347

[56] References Cited

U.S. PATENT DOCUMENTS 3,742,238  6/1973  Hoffman .......................... 250/334 X Primary Examiner—Davis L. Willis
Attorney, Agent, or Firm—Hopgood, Calimafde, Kalil, Blaustein & Lieberman

[57] ABSTRACT

The invention contemplates a heat-detection system with optical, scanner and display components for periodic mechanical heat-scanning of a given field and for so correcting the phase of electrical signals developed in the course of scanning as to enable development of a visible display of the field without phase-shift errors which are attributable to mechanical motion of the scanner.

9 Claims, 9 Drawing Figures

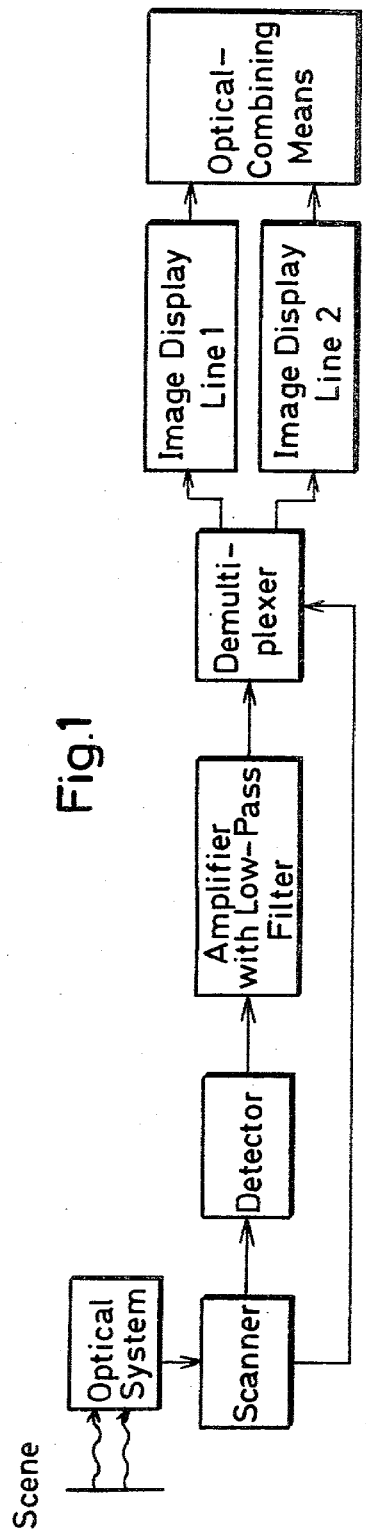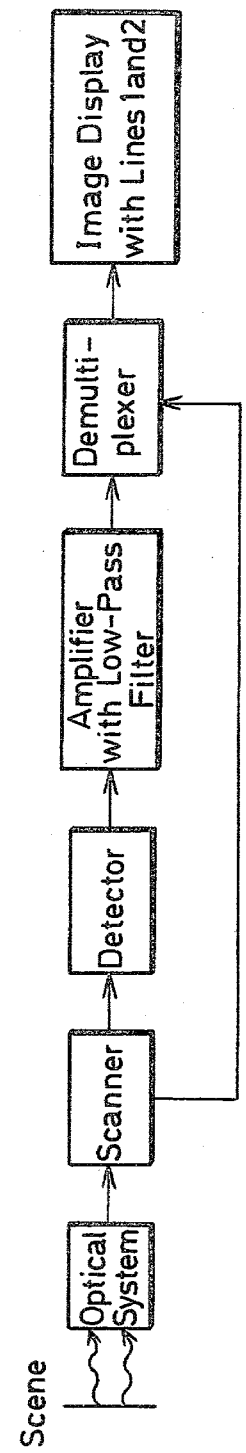

PROCESS AND APPARATUS FOR PRODUCING A HEAT IMAGE WITH COMPENSATION OF THE PHASE ERROR DUE TO SCAN ACTION

BACKGROUND OF THE INVENTION

This invention relates to a process of producing an image of a scene (field), and preferably a heat image, in which the scene to be observed is optically focused, analyzed linewise by a mechanically moved scanning device (scanner), and fed over a multi-element detector, the elements of which are arrayed in a row perpendicular to the scanning motion of the scanner, the video signals of the detector being fed via an amplifier to an image-presentation or display device. Aside from the process, the invention also covers an apparatus for the carrying out of the process.

In known devices for the production of heat images, as shown for example in U.S. Pat. No. 3,742,238, a plurality of rectangular detector elements are arrayed on a single crystal, spaced in a row one after the other, the distance between them corresponding to their individual length dimension, and their center lines being aligned in the direction of the row. Such a detector array provides a first dimensional component of an analysis of an image. The second dimension for analysis of the image is in the direction perpendicular to the detector row and is as a rule effected by a mechanically moved scanning device, a so-called scanner. The scanning device sweeps the observed scene over the detector in the direction perpendicular to the detector row. The scanner may consist of elements which oscillate back and forth, and which are used for scanning during both the forward and backward displacements of the oscillation.

Such a scanner is known in which an oscillating mirror sweeps the image of the scene over the detector row, as described, for instance, in German Gebrauchsmuster No. 7,217,873. By a slight tilting of the mirror in the direction of the detector row in each case at the end points of the main scanning motion, the result is obtained that the scene points which are focused, for instance, onto detector-element spacings during forward travel of the mirror are focused onto the detector elements themselves during return travel of the mirror, thus interlacing elements of the field sweep on forward travel, with elements of the field sweep on return travel. The image-presentation or display device consists in known devices of a row of light-emitting diodes, arrayed similarly to the detector array. Such a diode presentation is viewed, for instance, directly by means of an ocular, or is focused by means of an objective onto the cathode of an opto-electronic transducer, the display-ray path being folded, in each case, at the same oscillating mirror as effects the scanning of the scene.

The front side of the oscillating mirror is frequently used for scanning with the detector array, the rear side of the mirror being used for the reproduction or display.

In known processes and apparatus for the production of heat images, detector, amplifier and light-emitting diodes have only a limited electrical bandwidth. In order to improve the signal-to-noise ratio, the inherent bandwidth of the amplifier is generally additionally limited. As a result, a low-pass filtering action takes place in the image transmission. As a result of this, signal jumps which are produced by objects having sharp edges are transmitted at a finite rise rate or speed. A phase error results by which, for instance, the centroids of thin structures of the scene are delayed in time in the image, i.e., in the case of scanning of the lines in the direction from left to right, they are reproduced with a phase delay which presents the displayed appearance of a shift towards the right. If the scanning device is used in both forward and return directions of travel, the phase error upon the backward or return travel causes apparent shift to the left. Linear structures of the scene which are perpendicular to the scanning device are therefore reproduced in a degraded form, characterized by oppositely staggered interlaced offsets of given features of the field. As a result, the power of resolution of the apparatus is decreased.

SUMMARY OF THE INVENTION

The object of the invention is to provide a process and an apparatus for compensating for phase error of the character indicated, in a scanning and display system of the character indicated. This object is achieved in accordance with the invention, in the manner that in order to compensate for the phase error which occurs upon the transmission of signal jumps, the video signals coming from the row of individual elements of the detector array are so connected to two adjacent arrays of light-emitting diodes of an image reproduction system (1) that, upon forward-scan travel of the mirror, the elements of the one diode array are driven, and upon the return-scan motion of the mirror, the elements of the other diode array are driven, and (2) that the effective distance between center lines of directional alignment of the two diode arrays, i.e., of the elements of the two rows, is adjusted corresponding to the phase error to be compensated for.

A similar compensation of the phase error is obtained if the signals coming from the row of the individual elements on the detector device are connected to two rows of light-emitting diodes which are arranged, separated from each other in space on two different supports in such a manner that upon the forward movement of the mirror, the elements of one row (and upon the return movement of the mirror, the elements of the other row) are supplied with video signals, that the rows of light-emitting diodes are focused and effectively superimposed by optical means to form two adjacent rows appearing on a common support, and that the effective distance between the center lines of the elements of the two rows is adjusted corresponding to the phase error which is to be compensated for.

In order to carry out the process, there is provided in accordance with the invention an apparatus which consists of an oscillating mirror, a detector having a row of detector elements arranged spaced apart from each other, and an amplifier with low-pass filter, and which is characterized by the fact that the image presentation system of the transmission chain consists of two adjacent rows of light-emitting diodes upon a common support, the individual elements of said rows appearing at the gaps between the elements of the adjacent row when they are reflected by the oscillating mirror, the distance between the center lines of the individual elements of the two rows of light-emitting diodes being adjustable corresponding to the phase error to be compensated for, and that an electronic switch (demultiplexer) is provided between the oscillating mirror and the image-presentation device.

If the signals of the detector are connected to two rows of light-emitting diodes which are arranged separated from each other in space, it is advisable to provide at the image presentation device, optical means for focusing and effectively superimposing the rows of light-emitting diodes arranged on separated supports to form two adjacent rows which appear to be on a common support, and for an electronic switch (demultiplexer) to be provided for the alternate driving of the rows of light-emitting diodes between the oscillating mirror and the image-presentation device.

The electronic switch assures that during forward motion of the mirror, the elements of one of the two rows of light-emitting diodes are driven, and during return movement of the mirror, the elements of the other row of light-emitting diodes are driven.

For optical superposition of the two rows of light-emitting diodes which are arranged separated in space from each other, known means of physical or geometrical beam-splitting may be used.

DESCRIPTION OF PREFERRED EMBODIMENTS

The process in accordance with the invention and examples of apparatus in accordance with the invention for carrying out the process are further explained in the drawing and described in greater detail. In the drawing:

FIG. 1 is a flow sheet showing the course of the individual process steps in the image transmission chain for one embodiment of the invention;

FIG. 2 is a flow sheet showing the course of the individual process steps of the image transmission chain for another embodiment of the invention;

Figure 4:
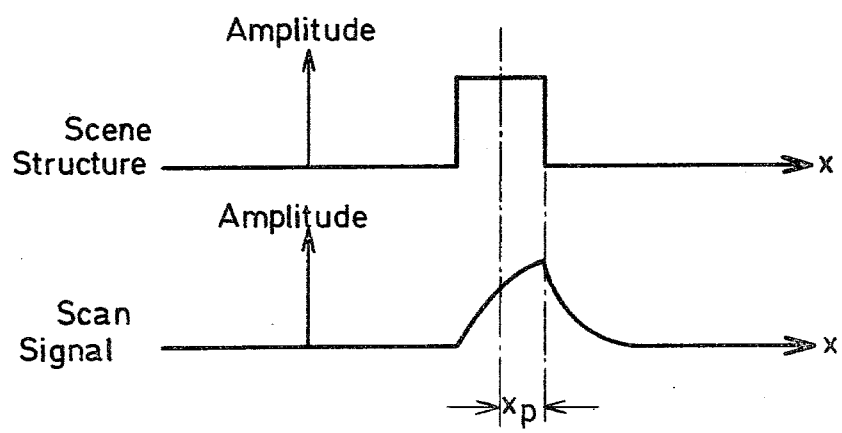
Figure 5:
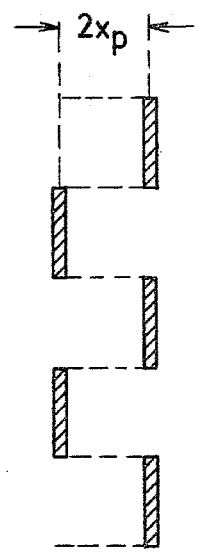
Figure 6B:
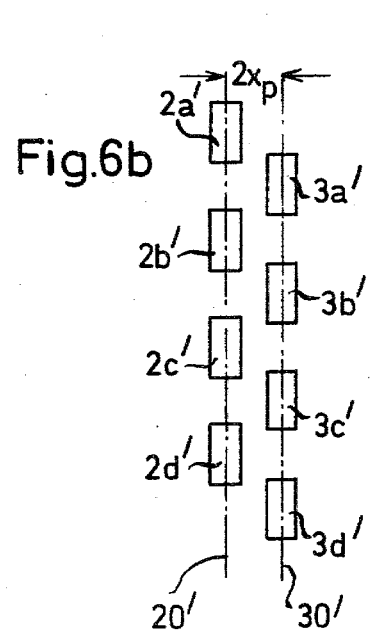
Figure 6A:
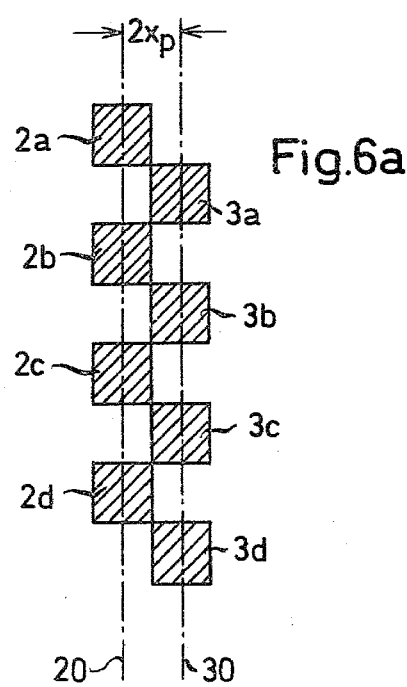
Figure 7:
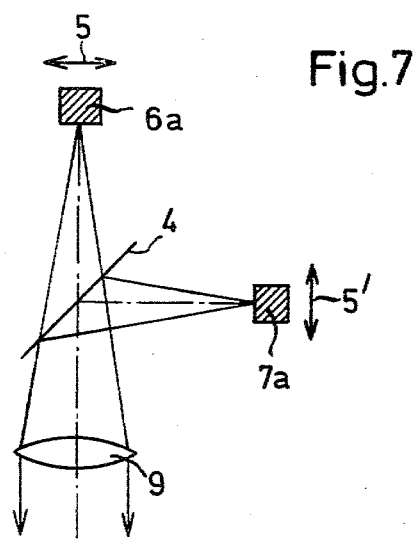
Figure 8:
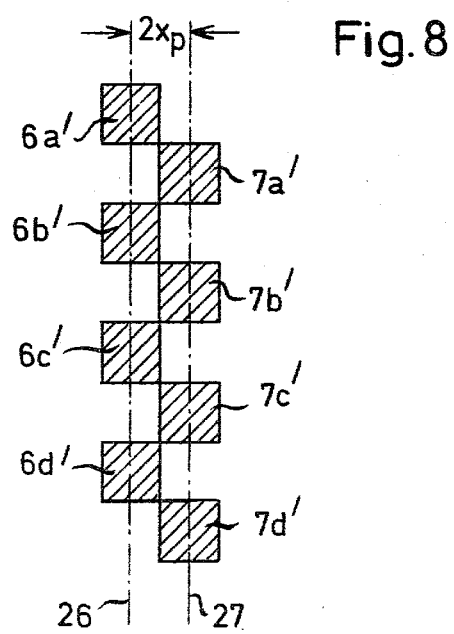

FIG. 4 graphically illustrated a phase jump as a result of low-pass-filter action of the transmission chain when using a "mechanical scanner" member in the forward direction;

FIG. 5 is a diagram to show the effect of phase error in linear presentation of part of the scanned field, when mechanically scanning in forward and rearward directions, for the case of the detector array oriented perpendicular to the scan direction;

FIGS. 6a and 6b show the appearance of two rows of light-emitting diodes on an image-presentation device when they are reflected by the oscillating mirror;

FIG. 7 is a fragmentary showing of the arrangement in accordance with the invention of two rows of light-emitting diodes arranged on separate supports and combined optically by a semi-reflecting mirror; and FIG. 8 shows an example of the images, combined optically on a support, or rows of light-emitting diodes arranged on separate supports.

Figure 3:
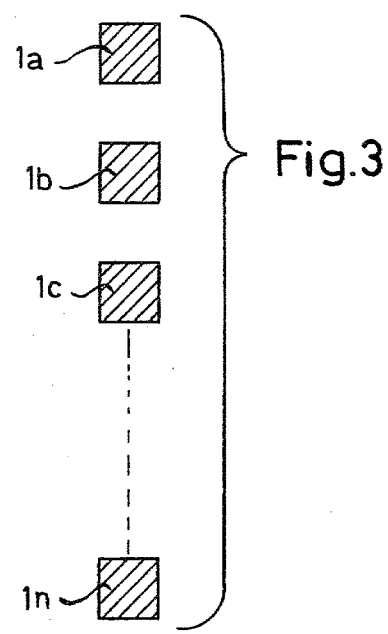
FIG. 3 is a diagram to show relative positioning of a linear array of detector elements on the "detector" member of the transmission chain.

In the flow sheet of FIG. 1, descriptive legends have been applied to functional components of the transmission chain, in performing the process of the invention. Radiation emitted from the observed scene strikes a focusing optical system and is focused (imaged) by the latter on a detector. The detector effects an analysis of the image in the alignment direction of the linear array of individual detectors $1a \ldots 1n$, the relation of detector elements in the array being shown in FIG. 3. Analysis of the image in the direction perpendicular to the direction of the row of detectors is effected by a mechanically moving scanning device, referred to as the "scanner," which is interposed between the focusing lens system and the detector, and which sweeps the scene over the detector. Upon change of radiation impinging on the detector elements, electrical signals are produced which are individually amplified by amplifiers and fed to an image presentation or display device. In order to compensate for the phase error which occurs upon the transmission of signal jumps, it is a feature of the invention that the display means comprises light-emitting diodes appearing in two rows in accordance with FIG. 6a or FIG. 6b. FIG. 4 shows how a centroid of a thin structural element of the scene in the image is reproduced, delayed in time, i.e., shifted in the scanning direction x, due to the phase error. The amount of the shift is designated $x_p$ in FIG. 4. If the scanning device is used in both forward and reverse directions of scan, this phase error necessarily means that structural elements of the scene which are perpendicular to the scanning direction are reproduced in meandering (i.e., alternating offset) pattern at an offset spacing $2x_p$, as shown in FIG. 5.

FIGS. 6a and 6b illustrate alternative embodiments, each of which employs two rows of light-emitting diodes in laterally offset interlace, as they appear on the image-display means after reflection by the oscillating mirror. These light-emitting diodes are designated $2a$-$2d$ and $3a$-$3d$, and by $2a'$-$2d'$ and $3a'$-$3d'$, respectively. In the respective examples of FIGS. 6a and 6b, they are developed square and rectangular and are so applied to a single crystal that the respective center lines 20, 30 and 20', 30' of the corresponding rows are spaced from each other by the amount $2x_p$. However, the invention is not limited to diode elements which are of square or rectangular development, but rather said elements may be any desired contour, for instance that resulting from their manufacture, and be so arranged that the elements of one row appear to fall within the gaps of the other row or appear to overlap them.

FIG. 7 shows optical combination of the images of two individual elements 6a and 7a of one row of light-emitting diodes. The two rows are arranged separated from each other, for instance each on a separate single crystal.

As a result of optically combining the images 6a' and 7a' by means of the oscillating mirror and physical beam-splitting—in the example shown, via a partially reflective mirror 4—the images of the elements of one row fall within spaces between elements of the other row. There is produced the image shown in FIG. 8 of two rows of light-emitting diodes 6a'-6d' and 7a'-7d' which are staggered with respect to each other. The double-ended arrows 5 and 5' represent a shift element which serves to adjust the spacing $2x_p$ by shifting one or both rows of light-emitting diodes.

The use of the beam-splitting display technique of FIG. 7 will be understood to be an illustration of the overall process of FIG. 1, wherein the separate demultiplexed scan signals are keyed in alternation to one or the other of the two separately mounted rows of display diodes, in accordance with the instantaneous direction of scan, there being optical means for so combining these diode displays as to effectively neutralize phase error in the ultimate display. It is also possible to achieve the desired result if the two rows of display diodes, with their individual elements positioned in interlaced and staggered offset, in the manner displayed in FIG. 8, are mounted to the same image-display support and are similarly keyed in alternation in accordance with the instantaneous direction of scan action, as suggested by FIG. 2, it being then unnecessary to resort to optical means (as in FIG. 7) in order to view the combined display result, appropriately phase-corrected for the offset $2x_p$.

What is claimed is:

1. A process of producing an image of a scene, preferably a heat image, in which the scene to be observed is focused optically, is analyzed linewise by a mechanically moved scanning device (scanner), and is conducted over a multi-element row detector whose elements are arranged in a row perpendicular to the scanning device of the scanner, the signals of the detector being fed via an amplifier to an image presentation device, characterized by the fact that, in order to compensate for the phase error ($x_p$) which occurs upon the transmission of signal jumps, the signals coming from the row of the individual elements ($1a$–$1n$) of the detector device are connected to two adjacent rows of light-emitting diodes ($2a$–$2n$, $3a$–$3n$) of an image reproduction system in the manner that upon the forward travel of the mirror, the elements of the one row ($2a$–$2n$) and upon the rearward movement of the mirror the elements of the other row ($3a$–$3n$) are driven and that the distance between the center lines (20, 30), extending in the row-wise direction, of the elements of the two rows ($2a$–$2n$, $3a$–$3n$) is adjusted in accordance with the phase error to be compensated for.

2. A process of producing an image of a scene, preferably a heat image, in which the scene to be observed is focused optically, is analyzed linewise by a mechanically moved scanning device (scanner), and is conducted over a multi-element row detector whose elements are arranged in a row perpendicular to the scanning device of the scanner, the signals of the detector being fed via an amplifier to an image presentation device, characterized by the face that the signals coming from the row of individual elements ($1a$–$1n$) in the detector device are connected to two rows of light-emitting diodes ($6a$–$6n$ and $7a$–$7n$) arranged separated in space from each other on two different supports in the manner that upon the forward movement of the mirror the elements of one row are driven and upon the return travel of the mirror the elements of the other row are driven, that the rows of light-emitting diodes are imaged and are superimposed by optical means to form two adjacent rows ($6a'$–$6d'$ and $7a'$–$7d'$) appearing on a common support, and that the distance ($2x_p$) between the center lines (26, 27) of the elements of the two rows is adjusted in accordance with the phase error to be compensated for.

3. Apparatus for producing an image of a scene, preferably a heat image, in which the scene to be observed is focused optically, is analyzed linewise by a mechanically moved scanning device (scanner), and is conducted over a multi-element row detector whose elements are arranged in a row perpendicular to the scanning device of the scanner, the signals of the detector being fed via an amplifier to an image presentation device, the transmission chain of said apparatus comprising an oscillating mirror, a detector having a row of detector elements arranged spaced apart from each other, and an amplifier with low-pass filter, characterized by the face that the image presentation device of the transmission chain consists of two adjacent rows of light-emitting diodes ($2a$–$2d$, $3a$–$3d$, or $2a'$–$2d'$, $3a'$–$3d'$) arranged on a common support, the individual elements of which appear to be arranged by gaps between the elements of the adjacent row, the distance ($2x_p$) between the center lines (20, 30) and (20', 30'') of the individual elements of the corresponding two rows being adjustable in accordance with the phase error to be compensated for, and that an electric switch (demultiplexer) is provided between the oscillating mirror and the image reproduction device.

4. Apparatus for producing an image of a scene, preferably a heat image, in which the scene to be observed is focused optically, is analyzed linewise by a mechanically moved scanning device (scanner), and is conducted over a multi-element row detector whose elements are arranged in a row perpendicular to the scanning device of the scanner, the signals of the detector being fed via an amplifier to an image presentation device, characterized by the fact that for the image presentation device two rows of light-emitting diodes ($6a$–$6n$, $7a$–$7n$) which are arranged separated from each other in space are provided on image-reproduction devices, and that optical means are provided for focusing and superimposing (4) the two rows of light-emitting diodes to form two adjacent rows ($6a'$–$6d'$, $7a'$–$7d'$).

5. An apparatus according to claim 4, characterized by the fact that for the superimposing of the rows of light-emitting diodes physical beam-splitting means are provided.

6. An apparatus according to claim 4, characterized by the fact that for the superimposing of the rows of light-emitting diodes, geometrical beam-splitting means are provided.

7. In a scanning optical system wherein a linear array of like spaced detector elements is caused to sweep a field via a mirror that is periodically oscillated transverse to the linear dimension of the array, and wherein a corresponding linear array of light-emitting diodes is supplied by video outputs of the corresponding detector elements in the development of an electrically reproduced display or presentation of the swept field, the improvement in which said array of light-emitting diodes is one of two physically separate linear arrays at effective lateral offset with respect to each other, and wherein signal-processing means responsive to the detector outputs is caused to supply detector-video signals to one to the exclusion of the other of said diode arrays during a first direction of sweep and is caused to supply detector-video signals to the other of said diode arrays to the exclusion of said one diode array during the opposite direction of sweep.

8. The improvement of claim 7, in which adjustment means is provided for selection of the effective lateral offset of said diode arrays with respect to each other.

9. The improvement of claim 7, in which the scanning optical system is of the variety wherein said mirror sweeps at a first tilt for a first direction of sweep and at a second tilt for the opposite direction of sweep, said first and second tilts establishing an interlacing offset of detector-element sweep paths for the respective mirror sweeps, and in which said arrays of light-emitting diodes are in staggered interlace.

* * * * *